(12) United States Patent
Kowalski

(10) Patent No.: US 7,394,797 B2
(45) Date of Patent: Jul. 1, 2008

(54) MEDIUM SENSING HISTOGRAM FOR WLAN RESOURCE REPORTING

(75) Inventor: John M. Kowalski, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 544 days.

(21) Appl. No.: 10/933,861

(22) Filed: Sep. 2, 2004

(65) Prior Publication Data

US 2006/0046688 A1   Mar. 2, 2006

(51) Int. Cl.
*H04Q 7/24* (2006.01)
*H04J 3/00* (2006.01)
*H04J 3/24* (2006.01)
*H04B 7/212* (2006.01)
*H04L 12/413* (2006.01)
*H04L 12/43* (2006.01)

(52) U.S. Cl. .................. 370/338; 370/336; 370/349; 370/442; 370/448; 370/458; 370/459; 370/474; 370/475; 370/476

(58) Field of Classification Search .......... 370/349, 370/442, 448, 458, 459, 474, 475, 476, 336, 370/338
See application file for complete search history.

(56) References Cited

U.S. PATENT DOCUMENTS

| 6,131,013 | A | 10/2000 | Bergstrom et al. |
| 6,922,390 | B1 * | 7/2005 | Chapman et al. ............ 370/229 |
| 2003/0185176 | A1 | 10/2003 | Lusky et al. |
| 2003/0198200 | A1 | 10/2003 | Diener et al. |
| 2004/0137915 | A1 | 7/2004 | Diener et al. |
| 2004/0151137 | A1 | 8/2004 | McFarland et al. |
| 2005/0157676 | A1 * | 7/2005 | Kwak et al. ................. 370/328 |
| 2007/0002757 | A1 * | 1/2007 | Soomro et al. .............. 370/252 |
| 2007/0002890 | A1 * | 1/2007 | Mangold et al. ............ 370/459 |
| 2007/0076620 | A1 * | 4/2007 | Zhong et al. ................ 370/252 |

* cited by examiner

*Primary Examiner*—Lester Kincaid
*Assistant Examiner*—Nathan Mitchell
(74) *Attorney, Agent, or Firm*—Madson & Austin

(57) ABSTRACT

The admissibility of periodic traffic to a wireless medium can be estimated using a measurement report format that includes a field indicating the number of bins for a predetermined channel of the wireless medium that were busy during a measurement period, and a field indicating the number of bins for the predetermined channel of the wireless medium that were idle during the measurement period. Additionally, the measurement report format includes a field indicating the granularity in multiples of slot times of the wireless medium and a plurality of Bin Density fields, such that one Bin Density field indicates a density of medium time that the wireless medium is busy, and at least one other Bin Density field indicates a distribution of idle time after the wireless medium was busy for time 0 slots.

6 Claims, 2 Drawing Sheets

200

| CHANNEL NUMBER | CHANNEL BAND | ACTUAL MEASUREMENT START TIME | MEASUREMENT DURATION | MEDIUM SENSING MEASUREMENT SUBTYPE | RPI THRESHOLD | BIN OFFSET | BIN DURATION | NUMBER OF BINS FOR CHANNEL BUSY $n_{busy}$ |
|---|---|---|---|---|---|---|---|---|
| OCTETS: 1 | 1 | 8 | 2 | 1 | 1 | 1 | 1 | 1 |

| NUMBER OF BINS FOR CHANNEL IDLE $n_{idle}$ | SLOT MULTIPLIER | TOTAL NUMBER OF MEDIUM SENSING INTERVALS | $n_{busy} * n_{idle}$ BIN 0 DENSITY | $n_{busy} * n_{idle}$ BIN 1 DENSITY | ... | $n_{busy} * n_{idle}$ BIN N-1 DENSITY |
|---|---|---|---|---|---|---|
| OCTETS: 1 | 1 | 8 | 2 | 2 | | 2 |

MEDIUM SENSING HISTOGRAM FOR WLAN RESOURCE REPORTING

BACKGROUND OF THE INVENTION

1. Field of the Invention

The present invention relates to telecommunications. In particular, the present invention relates to format for a medium sensing measurement histogram report.

2. Description of the Related Art

The IEEE 802.11k standard relates to radio resource measurements. In particular, IEEE 802.11k Draft 1.0 specifies a "Medium Sensing Time" histogram measurement report that is used for measuring the distribution of busy and idle times on the medium. The measurements are marginal distributions, and as such, do not provide information that would be useful to a station management entity for determining whether a given audio/video stream would be admissible on the medium, based on the Quality of Service (QoS) requirements for the audio/visual stream for throughput, latency, jitter, and medium servicing requirements.

Accordingly, the measurement, as proposed, is not particularly useful for determining whether a Traffic Specification (TSPEC) can be admitted for a QoS flow. QoS flows generally have requirements for service times (a stream must get a poll approximately every $T_{service}$ seconds, in which the medium would be construed as "busy," and would, in general, allow for idle times of $T_{idle}$ seconds. By obtaining an estimate of busy and idle times, and communicating the estimates to higher layers, a convergence layer, an application layer, or a station management entity would have information relating to whether the medium may support the admission of a particular AV or Voice Over IP (VoIP) stream.

FIG. 1 shows the field format 100 of a conventional Medium Sensing Time Histogram Report, as set forth in the IEEE 802.11k Draft 1.0. The Channel Number field is used for indicating the channel number to which the Medium Sensing Time Histogram Report applies. The Channel Band field is used for indicating the frequency band for which the measurement report applies. The Actual Measurement Start Time field is set equal to the value of the Time Synchronization Function (TSF) timer of the measuring Station (STA) at the time at which the measurement is started. The Measurement Duration field is set equal to the duration over which the Media Sensing Time Histogram Report was measured and is expressed in Time Units (TUs).

The Medium Sensing Measurement Subtype field is used for indicating the subtype of Medium Sensing Time Histogram Report. The Request Polling Interval (RPI) Threshold field is used for identifying a received power level threshold as seen at the antenna connector. The RPI Threshold field is used for determining when a Medium Sensing Interval begins and ends, while collecting information for the RPI Time Histogram.

The Bin Offset field is used for indicating the position of the first bin and is expressed in microseconds. The Bin Duration field is used for indicating the time interval during which Medium Sensing Events are counted to be in a bin and are expressed in slot times. The Number of Bins field is used for indicating the total number of time intervals that are covered by the time histogram. The Total Number of Medium Sensing Intervals is used for indicating how many intervals have been counted during the measurement. Lastly, the Medium Sensing Time Histogram Report contains fields for indicating the measured densities of each of the N time intervals in the specified channel over the measurement duration.

Table 1 indicates the definitions for the Medium Sensing Interval, as set forth in the IEEE 802.11k Draft 1.0.

TABLE 1

| Medium Sensing Measurement Type | Medium Sensing Measurement Name | Medium Sensing Interval |
| --- | --- | --- |
| 0 | RPI Time Histogram | Time interval during which RPI is above the specified RPI Threshold |
| 1 | Clear Channel Assessment (CCA) Idle Time Histogram | CCA Idle Time interval |
| 2 | CCA Busy Time Histogram | CCA Busy Time interval |
| 3 | Network Allocation Vector (NAV) Busy Time Histogram | Initial NAV time value when set |
| 4-255 | Reserved | Reserved |

To compute the Bin i density, $B_i$, $0 \leq i < N$, the STA initializes all Bin values to zero. During the measurement duration the STA monitors the measurement channel for the medium sensing intervals of the requested subtype. The length (duration) of the detected interval determines which bin count is to be incremented. If the detected interval has a duration time t with:

$$i_0 + (i^* \Delta i) \leq t < i_0 + ((i+1)^* \Delta i) \text{ for } i < N-1, \text{ and} \quad (1)$$

$$i_0 + (i^* \Delta i) \leq t \text{ for } i = N-1, \quad (2)$$

with $$i_0 = \text{bin offset}, \quad (3)$$

$$\Delta i = \text{bin interval}, \quad (4)$$

$$i = \text{bin index, and} \quad (5)$$

$$N = \text{number of bins}, \quad (6)$$

then the interval count in Bin i is increased by one, except when the bin contains a count of 255. During the Medium Sensing Measurement, a histogram is generated that represents the probability distribution of Medium Sensing Time Intervals.

If a measurement request is received in which $i_0 + ((N-1)^* \Delta i)$ is greater than the requested measurement duration, the measurement request is deemed invalid and is ignored.

What is needed is a way for admission control units that admit TSPECs to have a measurement of joint densities of idle and busy times.

SUMMARY OF THE INVENTION

The present invention provides a way for admission control units that admit TSPECs to have a measurement of joint densities of idle and busy times.

The advantages of the present invention are provided by a measurement report format for a wireless medium includes a field indicating the number of bins for a predetermined channel of the wireless medium that were busy during a measurement period, and a field indicating the number of bins for the predetermined channel of the wireless medium that were idle during the measurement period. Additionally, the measurement report format includes a field indicating the granularity in multiples of slot times of the wireless medium and a plurality of Bin Density fields, such that one Bin Density field indicates a density of medium time that the wireless medium is busy, and at least one other Bin Density field indicates a distribution of idle time after the wireless medium was busy for time 0 slots. In one exemplary embodiment of the present invention, the field indicating the number of bins for the predetermined channel of the wireless medium that were busy during a measurement period is one octet in length, the field indicating the number of bins for the predetermined channel of the wireless medium that were idle during the measurement period is one octet in length, the field indicating the granularity in multiples of slot times of the wireless medium is one octet in length, and each Bin Density field is two octets in length. Another exemplary embodiment of the present invention provides a measurement report format that includes a measurement sensing subtype field indicating a Joint CCA Idle/Busy Time Histogram.

BRIEF DESCRIPTION OF THE DRAWINGS

The present invention is illustrated by way of example and not by limitation in the accompanying figures in which like reference numerals indicate similar elements and in which.

DETAILED DESCRIPTION OF THE PRESENT INVENTION

According to the present invention, the definition of medium sensing interval, the Measurement Sensing Subtype 4 (or an equivalent) is reserved for "Joint CCA Idle/Busy Time Histogram," although not indicated in Table 1. Consequently, the present invention provides a way for TSPECs to provide a measurement of joint densities of idle/busy time. That is, a Medium Sensing Time Histogram Report according to the present invention provides the probability that a medium is busy for $T_0$ seconds and the medium was idle for $T_1$ prior to the medium being busy.

Figure 1:
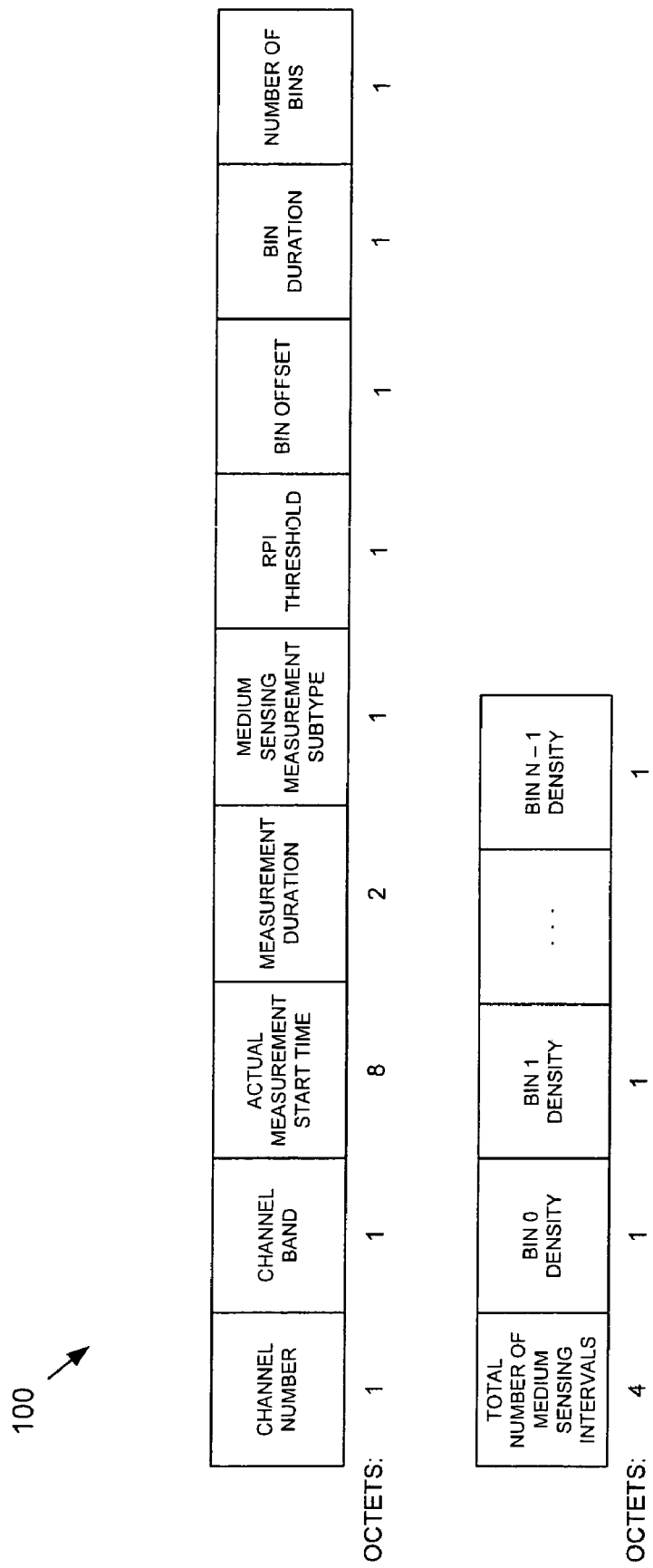
FIG. 1 shows the field format of a conventional Medium Sensing Time Histogram Report, as set forth in the IEEE 802.11k Draft 1.0.
Figure 2:
FIG. 2 shows an exemplary field format of a Medium Sensing Time Histogram Report according to the present invention.

FIG. 2 shows an exemplary field format 200 of a Medium Sensing Time Histogram Report according to the present invention. Field format 200 differs from conventional field format 100, shown in FIG. 1, as follows. When a "Joint CCA Idle/Busy Time Histogram" is indicated by the Measurement sensing subtype field, the "Number of Bins" field is interpreted as a "Number of Bins For Channel Busy" field, which is one (1) octet long and is followed by another field that is interpreted as a "Number of Bins For Channel Idle" field that is one (1) octet in length. These two numbers are respectively referred to herein as $n_{busy}$ and $n_{idle}$.

Additionally, the present invention provides another field after the "Number of Bins For Channel Idle" field, which is refeffed to as a "Slot Multiplier" field and is one (1) octet in length. The "Slot Multiplier" field represents the granularity in multiples of 802.11 slot-times, which are Physical Layer Device (PHY)-dependent (for example, the slot times are 9 microseconds in 802.11a.)

After the conventional "Total Number of Medium Sensing Intervals" field, there are N Bin Density fields. The first Bin Density field, Bin 0, represents the density of medium time that the medium is busy. Bin Density fields Bin i through Bin $n_{idle}-1$ following the 0-th bin represent the distribution of idle time after the medium was busy for time 0 slots. The units of the Density Bins are in slots. The "Total Number of Medium Sensing Intervals" field is eight (8) octets in length and each Bin Density field is two (2) octets in length. This enables measurement durations of longer periods of time than is conventionally indicated in IEEE 802.11k Draft 1.0, which assumes all bin widths should accommodate a roughly uniform distribution.

The Histogram Report is calculated as follows:

a. All bins are initialized to zero.

b. The 0-th bin is represented as "medium busy." The i=1 to $n_{idle}-1$ bins following the 0-th bin represent the distribution of idle time after the medium was busy for time 0 slots.

c. In general, bin $i=k*n_{idle}+r$ for (k=0 to $n_{busy}$, r=0) represents the probability of the medium being idle for k TUs after the medium was busy for r slots*Slot Multiplier.

Computation of the Histogram Report generally follows the computation of a conventional Histogram Report, as set forth in the IEEE 802.11k Draft 1.0, except that the bins are updated only when the events described in steps b. and c. above occur. That is, when the detected interval has a duration time t with $$(i*\text{Slot Multiplier}) \leq ((i+1)*\text{Slot Multiplier}) \quad (7)$$

for $$i=k*n_{idle}+r, (k=0 \text{ to } n_{busy}, r=0) < n_{busy}*n_{idle}-1,$$

or $$(i*\text{Slot Multiplier}) \leq t \text{ for } i=n_{busy}*n_{idle}, \quad (8)$$

then the interval count in Bin i is increased by one, except when the bin contains a count of $2^{16}-1$.

Thus, the present invention generates a Histogram Report that represents the probability distribution of the probability that the medium is idle after the medium was busy. Accordingly, a good estimate of the admissibility of periodic traffic may be made that would be especially useful for admitting traffic for use in Voice Over Internet Protocol (VoIP), or Standard Definition TV (SDTV) or High Definition TV (HDTV) for polled access because by knowing how frequently idle time happens as punctuated by busy time, a device can determine whether latency and servicing requirements for stream transport can be met.

It should be understood that the exemplary field format of the present invention illustrated in FIG. 2 could be arranged differently or could contain additional and/or different fields. For example, a field format could be used that contains a field indicating the probability of the medium being busy following the medium being idle and/or a field indicating the probability that a periodic stream can be supported on the medium.

Although the foregoing invention has been described in some detail for purposes of clarity of understanding, it will be apparent that certain changes and modifications may be practiced that are within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for formatting a measurement report for a wireless medium, the method comprising:

indicating, by a first field, a number of bins for a predetermined channel of the wireless medium that were busy during a measurement period;

indicating, by a second field, a number of bins for the predetermined channel of the wireless medium that were idle during the measurement period;

combining the first field and the second field to provide a probability measurement that indicates the probability that the wireless medium is idle after the medium is busy; and providing a plurality of bin density fields, one bin density field indicating a density of medium time that the wireless medium is busy, and at least one other bin density field indicating a distribution of idle time after the wireless medium was busy for time 0 slots.

2. The method according to claim 1, wherein the first field indicating the number of bins for the predetermined channel of the wireless medium that were busy during the measurement period is one octet in length, and wherein the second field indicating the number of bins for the predetermined channel of the wireless medium that were idle during the measurement period is one octet in length.

3. The method according to claim 1, further comprising a third field indicating a granularity in multiples of slot times of the wireless medium.

4. The method according to claim 3, wherein the third field indicating the granularity in multiples of slot times of the wireless medium is one octet in length.

5. The method according to claim 1, wherein each bin density field is two octets in length.

6. The method according to claim 1, further comprising a measurement sensing subtype field indicating a Joint Clear Channel Assessment (CCA) Idle/Busy Time Histogram.

* * * * *

UNITED STATES PATENT AND TRADEMARK OFFICE
CERTIFICATE OF CORRECTION

PATENT NO. : 7,394,797 B2 Page 1 of 1
APPLICATION NO. : 10/933861
DATED : July 1, 2008
INVENTOR(S) : John M. Kowalski It is certified that error appears in the above-identified patent and that said Letters Patent is hereby corrected as shown below:

In Column 3, line 56 please replace "refeffed" with --referred--.

Signed and Sealed this

Thirtieth Day of December, 2008

JON W. DUDAS
*Director of the United States Patent and Trademark Office*